US010710197B2

(12) United States Patent
Roos et al.

(10) Patent No.: US 10,710,197 B2
(45) Date of Patent: Jul. 14, 2020

(54) METHOD AND SYSTEM FOR THE REMOTE LASER WELDING OF TWO COATED SHEETS

(71) Applicant: Bayerische Motoren Werke Aktiengesellschaft, Munich (DE)

(72) Inventors: Christian Roos, Munich (DE); Florian Oefele, Lenggries (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 294 days.

(21) Appl. No.: 14/565,670

(22) Filed: Dec. 10, 2014

(65) Prior Publication Data
US 2015/0144606 A1 May 28, 2015

Related U.S. Application Data

(63) Continuation of application No. PCT/EP2013/062158, filed on Jun. 12, 2013.

(30) Foreign Application Priority Data

Jun. 14, 2012 (DE) .......... 10 2012 210 012

(51) Int. Cl.
*B23K 26/242* (2014.01)
*B23K 26/03* (2006.01)
(Continued)

(52) U.S. Cl.
CPC .......... *B23K 26/242* (2015.10); *B23K 26/032* (2013.01); *B23K 26/044* (2015.10);
(Continued)

(58) Field of Classification Search
CPC ... B23K 26/322; B23K 26/242; B23K 26/032
(Continued)

(56) References Cited

U.S. PATENT DOCUMENTS 6,608,278 B1 * 8/2003 Xie .................... B23K 26/0608
219/121.64
2002/0003133 A1 1/2002 Mukasa et al.
(Continued)

FOREIGN PATENT DOCUMENTS

CN 1156075 A 8/1997
CN 1345647 A 4/2002
(Continued)

OTHER PUBLICATIONS

EPO Machine Translation of DE102010005896.*
(Continued)

*Primary Examiner* — Tu B Hoang
*Assistant Examiner* — Erin E McGrath
(74) *Attorney, Agent, or Firm* — Crowell & Moring LLP

(57) ABSTRACT

A method is provided for the remote laser welding of two coated sheets, wherein by way of a scanner, a laser beam is directed at the sheets to be connected to each other and guided on the sheets. The sheets are connected to each other by producing an end fillet weld on a lap joint. The continuous production of the weld is recorded by a camera and, if necessary, the path of the laser beam is corrected and adapted to a target weld course on the basis of an automatic evaluation of the recorded images.

1 Claim, 1 Drawing Sheet

(51) Int. Cl.
　　　*B23K 26/044*　　(2014.01)
　　　*B23K 26/082*　　(2014.01)
　　　*B23K 26/60*　　(2014.01)
　　　*B23K 103/08*　　(2006.01)
　　　*B23K 101/34*　　(2006.01)

(52) U.S. Cl.
　　　CPC ............ *B23K 26/082* (2015.10); *B23K 26/60* (2015.10); *B23K 2101/34* (2018.08); *B23K 2103/08* (2018.08)

(58) Field of Classification Search
　　　USPC .................................................... 219/121.64
　　　See application file for complete search history.

(56) References Cited

U.S. PATENT DOCUMENTS

| 2004/0173587 | A1 | 9/2004 | Musselman |
| 2005/0247681 | A1* | 11/2005 | Boillot ................. B23K 26/032 219/121.63 |
| 2006/0144826 | A1 | 7/2006 | Becker et al. |
| 2009/0302011 | A1 | 12/2009 | Behr et al. |
| 2012/0234805 | A1* | 9/2012 | Schwarz ................ B23K 26/03 219/121.63 |

FOREIGN PATENT DOCUMENTS

| CN | 1532022 A | 9/2004 |
| CN | 101400474 A | 4/2009 |
| CN | 101590570 A | 12/2009 |
| DE | 103 35 501 A1 | 2/2004 |
| DE | 10 2004 043 075 A1 | 4/2005 |
| DE | 10 2004 043 076 A1 | 4/2005 |
| DE | 10 2010 005 896 A1 | 10/2010 |
| DE | 103 09 157 B4 | 5/2011 |
| EP | 1 005 944 B1 | 9/2004 |
| JP | 61-159292 A | 7/1986 |
| JP | 4-138889 A | 5/1992 |
| JP | 11-47967 A | 2/1999 |

OTHER PUBLICATIONS

International Search Report dated Oct. 8, 2013, with English translation (Four (4) pages).

German Search Report dated Feb. 7, 2013, with partial English translation (Ten (10) pages).

English translation of Chinese Office Action dated Apr. 3, 2015 (nine pages).

* cited by examiner

METHOD AND SYSTEM FOR THE REMOTE LASER WELDING OF TWO COATED SHEETS

CROSS REFERENCE TO RELATED APPLICATIONS

This application is a continuation of PCT International Application No. PCT/EP2013/062158, filed Jun. 12, 2013, which claims priority under 35 U.S.C. § 119 from German Patent Application No. 10 2012 210 012.1, filed Jun. 14, 2012, the entire disclosures of which are herein expressly incorporated by reference.

BACKGROUND AND SUMMARY OF THE INVENTION

The invention relates to a method for the laser remote welding of at least two coated sheets, wherein the laser beam is directed onto the sheets to be joined to one another and guided thereon by way of a scanner device. Further, the invention also relates to a system for carrying out the method.

A method of the kind mentioned in the introduction is disclosed in DE 103 09 157 B4. With the previously disclosed method, the coated sheets to be joined are positioned on top of one another, as far as possible without a gap. During a first method step, the sheet facing the laser beam is first heated by the laser beam, wherein the coating of both sheets vaporizes on their mutually facing sides and is distributed between the sheets without the basic material of the sheets melting. During a second method step, the two sheets are welded by the laser beam in the region where the coating has been removed and in this way joined to one another by material-to-material bonding.

In addition, reference is also made to JP 11047967 A with regard to the prior art.

The invention is based on the object of providing a method of the above-mentioned type that does not have, or at least minimizes, the disadvantages which accompany the prior art.

This and other objects are achieved by a method, and corresponding system for carrying out the method, for the laser remote welding of two coated sheets, wherein a laser beam is directed onto the sheets to be joined to one another and guided on the sheets by way of a scanner device. With the method according to the invention, the coated sheets are joined to one another by producing an end fillet weld on a lap joint, wherein the continuous production of the weld is recorded by (at least one) imaging unit and, if necessary, the path of the laser beam (on the sheets to be joined) is corrected and matched to a desired weld course on the basis of an automatic evaluation of recorded images (or a recorded video sequence or similar). In particular, this takes place during the ongoing welding process.

In particular, "laser remote welding" is understood to mean a welding process using scanner technology or a scanner. Here, the laser beam is deflected by at least one movable rotating mirror or scanner mirror, and is positioned and guided onto the sheets to be joined, whereby very high processing speeds can be realized. The scanner can also have lens systems for focusing the laser beam. The welding operation is typically carried out without filler metals.

An "end fillet weld on a lap joint" is particularly understood to mean a welded joint between at least two sheets, wherein a top sheet rests on a bottom sheet in an at least partially overlapping manner and the weld is formed between at least one edge surface or side surface of the top sheet and the adjacent contact surface of the bottom sheet. Such a weld can also be referred to as a "side fillet weld". The end fillet weld can be formed as a continuous weld or in the manner of a stitch weld (i.e. with discontinuities in the weld).

The sheets to be joined to one another can be flat sheets (plates) or spatially formed sheets (shaped sheet metal parts). Preferably, it is provided that the sheets are zinc-coated steel sheets. Further, the sheets can also be aluminum-coated steel sheets. A zinc coating or aluminum coating is particularly understood to mean a zinc or aluminum-based anti-corrosion coating.

The provision according to the invention of an end fillet weld leads to very good degassing conditions for the coating material (in particular zinc), as a result of which disturbances to the process are significantly reduced compared with the prior art mentioned in the background section. In addition, with the method according to the invention, only one operation is required; the heating by the laser beam (for vaporizing the coating) described in DE 103 09 157 B4 is superfluous.

However, critical deviations from a specified desired weld course can occur when producing the end fillet weld, for example as a consequence of component tolerances. In order to prevent such deviations, according to the invention, an optical monitoring of the weld course (weld position detection by recording and evaluating images) and a corrective movement for the laser beam possibly resulting therefrom are also proposed, wherein the corrective movement is realized in particular by the scanner or by the scanner mirror fitted therein, so that the laser beam can precisely follow the specified desired weld course. This can also be referred to as online regulation of the weld course (or as online weld tracking). The method according to the invention therefore enables robust laser remote welding of at least two coated sheets, which is also suitable particularly for serial production in vehicle body construction.

A further advantage of the method according to the invention is to be seen in that the two coated sheets to be joined are welded without a gap or without spacing (i.e. with so-called zero gap) by means of the at least one fillet weld. A gap between the welded sheets is undesirable, as dirt and/or other corrosive media (in particular moisture) can penetrate, this being promoted by a capillary effect. With the method disclosed in DE 103 09 157 B4, the coating vapor condenses between the sheets, which necessarily leads to a spacing between these sheets. With the method described in JP 11047967 A, a spacing between the sheets (by means of melt craters) is provided from the outset, wherein the introduction of the melt craters for adjusting the gap constitutes a separate and elaborate operation.

The images or video sequences produced by the at least one imaging unit, such as a camera, and subsequently evaluated by way of a control unit are, in particular, grayscale image recordings. Preferably, it is provided that the region recorded by the camera is additionally illuminated by at least one artificial light source, which, for example, is of advantage with regard to smoke and vapor or a larger camera distance. The artificial light source can be built into the scanner, for example, or fixed externally on the scanner. Likewise, the camera can also be built into the scanner or fixed externally on the scanner.

The recorded images can be evaluated with regard to the weld course with reference to the step offset between the sheets, which is necessarily present on account of the overlap. As a result of the step offset, the position of the generated fillet weld can be easily identified on the recorded images and correlated with the step offset. This then allows a determination of the actual position of the laser beam and the calculation of a corrective movement, which is then realized by appropriate conversion by use of the scanner or the scanner mirror incorporated therein.

As an option, in a first method step, it can be provided that initially only the coatings (of the sheets) are vaporized with the laser beam (i.e. removed by vaporization) in the region of the end fillet weld to be applied, and that then, in a second method step, the sheets are welded with the same laser beam in the areas with the coating removed. The different energy contribution required in the individual method steps can, for example, be adjusted by the traversing speed of the laser beam (and/or, if necessary, also the number of traversals). Further, it is preferably provided that, in the first method step, the laser beam is actually widened by defocusing or oscillation, so that the coating can be vaporized in a relatively wide strip (without the sheet base material otherwise melting).

Alternatively, it can be provided that the coatings (of the sheets) are vaporized with a separate (second) laser beam in the region of the end fillet weld to be applied, wherein this separate laser beam leads the (first) laser beam for the welding operation. Accordingly, two laser beams are required here, but only one operation. Two laser beams can be implemented, for example, by two scanner devices or by so-called double-focus technology.

The images or video sequences recorded by the camera can also be automatically evaluated with regard to checking the quality of the generated end fillet weld, for example with regard to spatter, pores, cracks and the like. The automated evaluation can be undertaken by the control unit. This enables the quality of the generated end fillet weld to be checked by automated inspection without significant increase in effort or cost. Various possibilities for visual inspection of the weld quality are known from the prior art.

Preferably, it is provided that prior to producing the end fillet weld or a plurality of end fillet welds, first the desired weld course is determined or defined, which, among other things, can include a shortening and smoothing of the weld course, an optimization of the speed, an accessibility and collision check, a cycle time optimization and/or a sequence planning of a plurality of end fillet welds. Preferably, this is CAD-based. This can also be referred to as off-line path planning.

The system according to the invention for the laser remote welding of two coated sheets comprises:
  a scanner, by which the (at least) one laser beam can be directed and guided onto the sheets to be connected or joined to one another;
  (at least) one imaging unit, with which the continuous production of the weld (of an end fillet weld) by way of the laser beam can be (optically) recorded; and
  a control unit, such as in particular an appropriately programmed computer, with which the images recorded by the imaging unit are automatically evaluated and, based thereon, if necessary, the path of the laser beam is corrected and matched to a desired weld course.

Preferably, it is provided that the scanner is mounted on a movable mechanism. A movable mechanism is, for example, a robot, a gantry or the like. The working area can be increased by moving the scanner to different positions by way of the movable mechanism. If the traverse movements of the scanner take place simultaneously with the welding operation, this is referred to as welding "on the fly", as a result of which processing times can be considerably shortened. On the fly welding requires a synchronization of the movements (i.e. movement of the laser beam by the scanner and movement of the scanner by the mechanism), which can be taken into account both with the off-line path planning and with the online weld tracking. The control device is then designed or constructed appropriately for this purpose.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
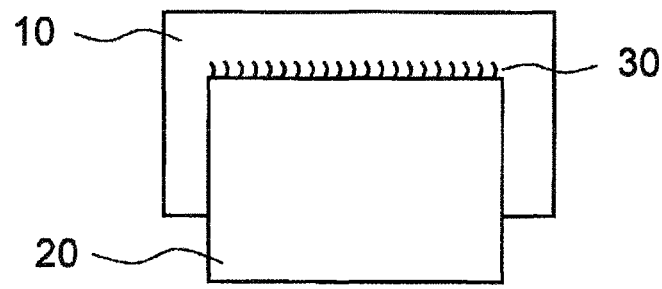
FIG. 1 shows two sheets joined to one another by way of an end fillet weld in a plan view.

FIG. 1 shows two coated flat sheets 10 and 20, which are arranged overlapping one another or with a lap joint and are joined to one another by material-to-material bonding by way of a straight end fillet weld 30. According to the diagram shown in FIG. 1, the sheet 10 can be designated as the bottom sheet and the sheet 20 as the top sheet. The top sheet 20 can rest completely on the bottom sheet 10 and be joined to the bottom sheet 10 by way of peripheral end or side fillet welds. An end fillet weld 30 can also have a course which is curved in one plane and, if necessary, also curved spatially.

Figure 2:
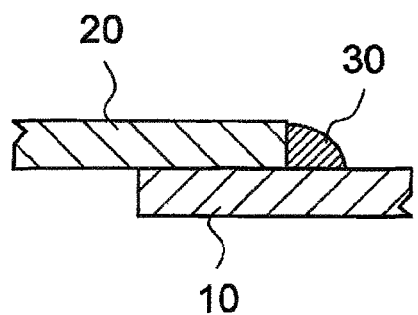
FIG. 2 shows a section through the end fillet weld from FIG. 1.

FIG. 2 shows a section through the end fillet weld 30. The form of the weld, which is formed between the edge surface or side surface of the top sheet 20 and the adjacent contact surface of the bottom sheet 10, can be clearly seen in this diagram.

Before welding, the top sheet 20 is positioned and aligned on the bottom sheet 10. The coated sheets 10 and 20 are then welded with a laser beam, which can be carried out on the system explained below in conjunction with FIG. 3.

Figure 3:
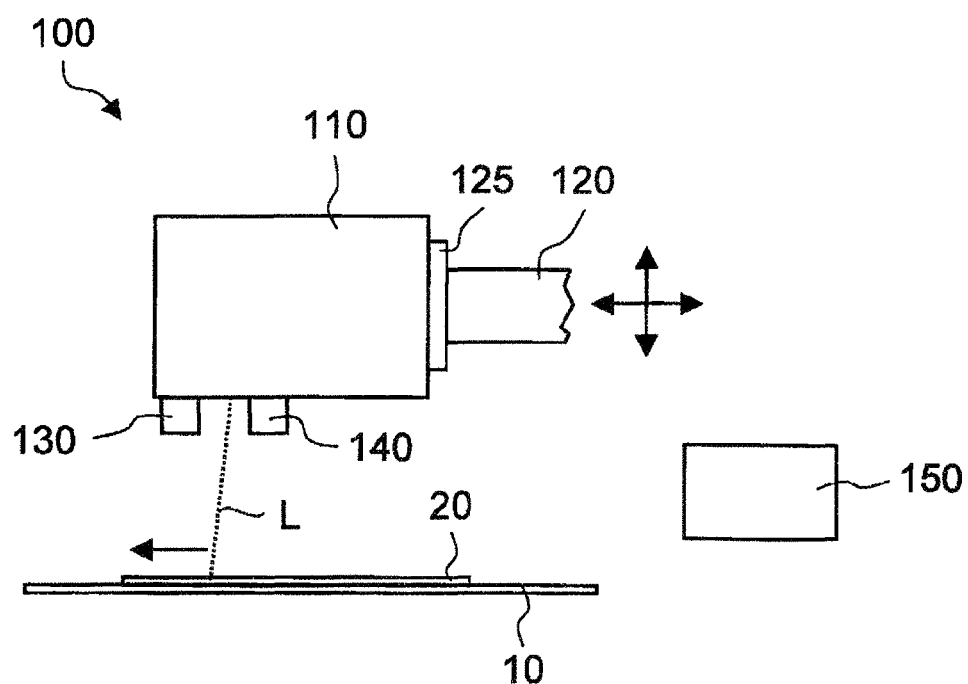
FIG. 3 shows a system according to an embodiment of the invention for laser remote welding in a schematic view.

FIG. 3 shows a system for laser remote welding which is designated as a whole by 100. The system 100 includes a scanner 110, which is known as such from the prior art and is fixed to a robot arm 120 of a robot by way of a flange 125. The scanner 110 can be moved in space by the robot, which is illustrated by the double arrows. This enables welding "on the fly" to be carried out as explained above. Further, the system 100 includes an illumination device 130 which is fixed to the scanner 110, and an imaging device 140, such as a camera which is likewise fixed to the scanner 110. The system 100 also includes a control unit 150 which is connected by way of interfaces (not shown) to the scanner 110, the illumination device 130, the camera 140 and the robot.

In order to weld the two coated sheets 10 and 20, they are positioned together. A laser beam L is then directed by way of the scanner 110 onto the sheets 10 and 20, which are arranged below the scanner 110, and guided along a specified path (desired weld course) over the sheets 10 and 20 (see arrow in FIG. 3), wherein an end fillet weld 30 as described above is formed. The formation of an end fillet weld 30 leads to good degassing conditions for the coating material, which vaporizes due to the heat introduced by the laser beam (as explained in detail above). Further possible ways of removing the coating from the sheets 10 and 20 are described above. Further, the end fillet weld allows the sheets 10 and 20 to be joined without a gap (as likewise explained in detail above).

The distance between the scanner 110 and the sheets 10/20 is, for example, 0.5 m or more, which increasingly leads to position errors. During the production of the weld, the end fillet weld 30 produced is continuously recorded by the camera 140, wherein the recorded region (this is typically the process zone directly and the zone immediately following the process zone) can be additionally illuminated by the illumination device 130. On the basis of the images or video sequences recorded by the camera 140, the actual weld course is automatically evaluated by the control unit 150, for example by comparison with the step offset between the sheets 10 and 20. In the event of a deviation from the desired weld course, the path of the laser beam L is corrected and matched to the desired weld course, which is likewise initiated by the control unit 150, which actuates the scanner 110 and/or the robot appropriately for this purpose. The path can be matched with an accuracy of +/−100 μm.

A quality control or quality check of the generated end fillet weld 30 can be undertaken on the basis of the images recorded by the camera 140 as already explained.

Instead of the arrangement of the illumination device 130 and the camera 140 shown by way of example in FIG. 3, these can also be coupled within the scanner 110, which can take place with the help of mirrors, for example.

LIST OF REFERENCES

Method and device for the laser remote welding of two coated sheets
10 Coated sheet (bottom sheet)
20 Coated sheet (top sheet)
30 End fillet weld (weld)
100 System
110 Scanner
120 Robot arm
125 Fixing flange
130 Illumination device
140 Camera
150 Control unit (control module)
L Laser beam The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for laser remote welding of two coated sheets, the method comprising the acts of:
   directing a laser beam onto the two coated sheets to be joined to one another and guiding the laser beam on the two coated sheets by way of a scanner;
   producing an end fillet weld on a lap joint between the two coated sheets in order to join the two coated sheets to one another;
   continuously recording images of a production of the end fillet weld, via a camera;
   comparing the continuously recorded images to a desired weld course by identifying a position of the generated end fillet weld on the recorded images and comparing a course of the generated end fillet weld to a step offset that is formed by an abutment between the two coated sheets that have not yet been welded; determining an actual position of the laser beam; calculating a correction movement amount;
   correcting a path of the laser beam to match it to the desired weld course, based on the correction movement amount to ensure continuous production of the end fillet weld; and
   checking a quality of the produced end fillet weld.

* * * * *